Feb. 7, 1933.  A. L. SEGELHORST ET AL  1,896,497
WELDING AND CUTTING APPARATUS
Filed Sept. 30, 1929  4 Sheets-Sheet 1

Inventor
AUGUST L. SEGELHORST
AND
ERNIE L. LAUNDER

By *Frank Hanrahan*
Attorney

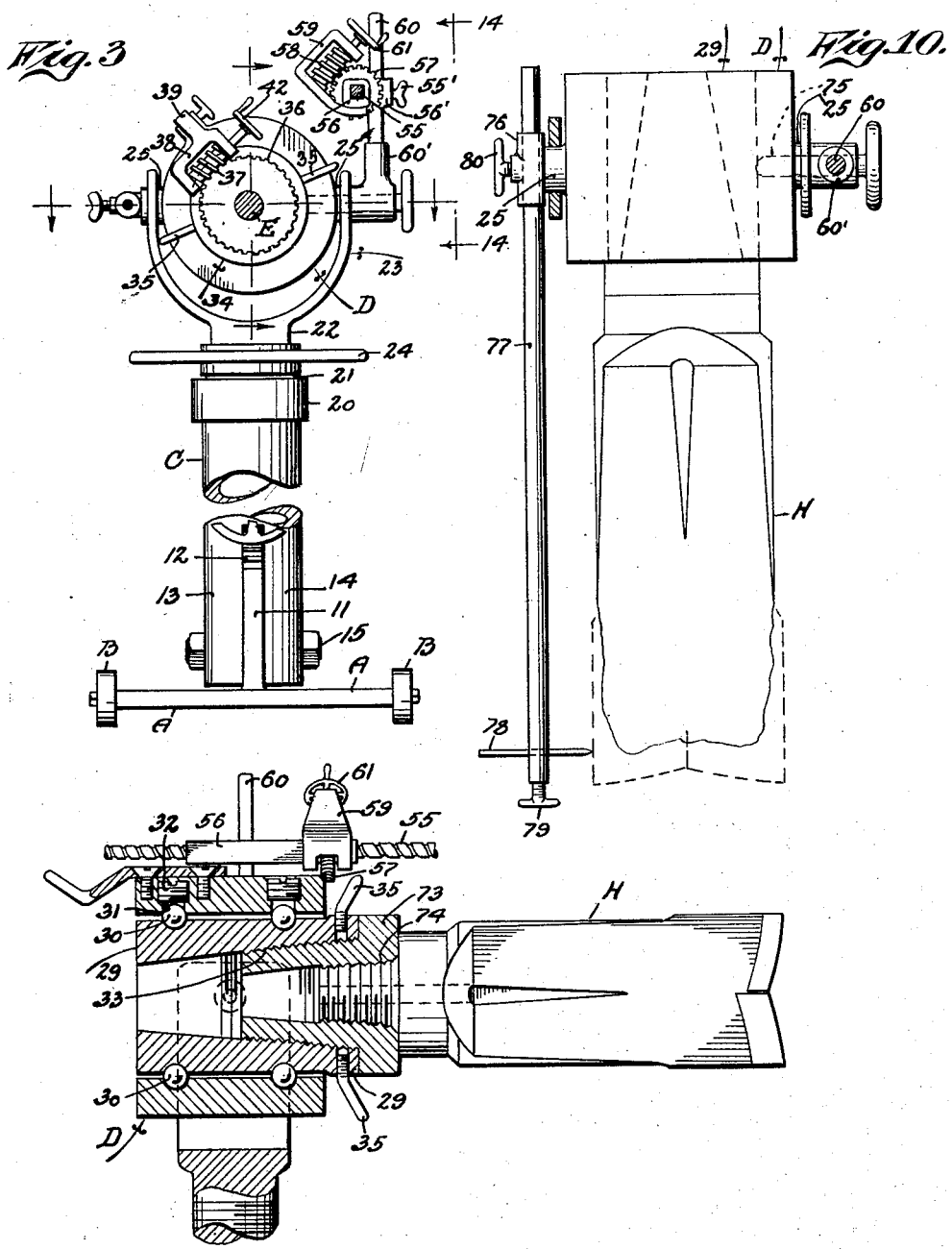

Feb. 7, 1933. A. L. SEGELHORST ET AL 1,896,497
WELDING AND CUTTING APPARATUS
Filed Sept. 30, 1929 4 Sheets-Sheet 3
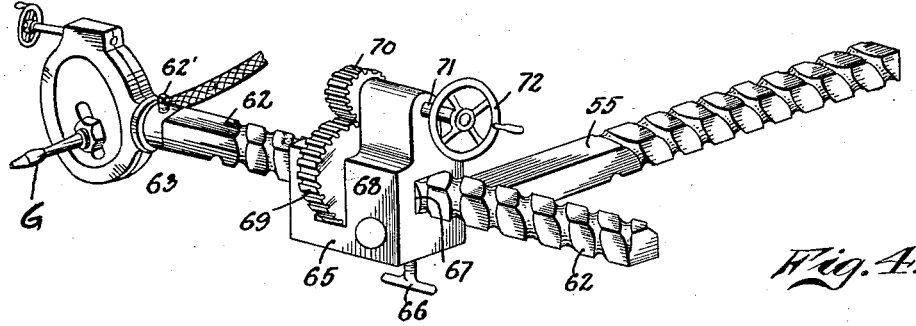
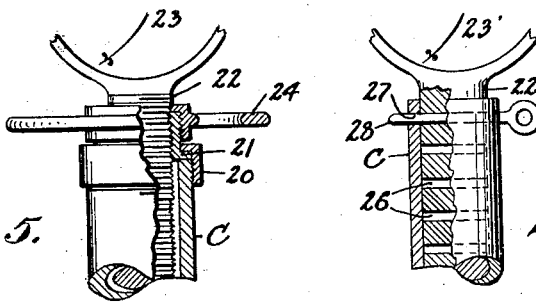
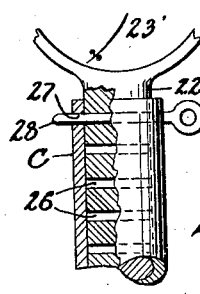
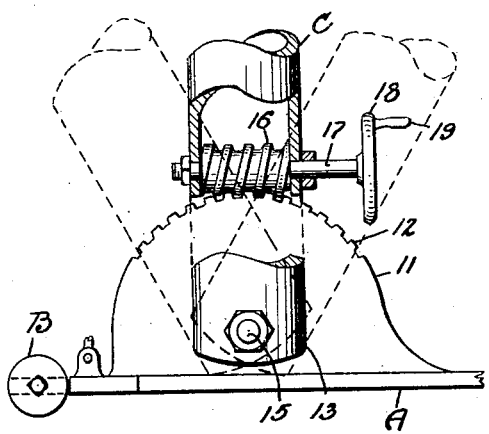
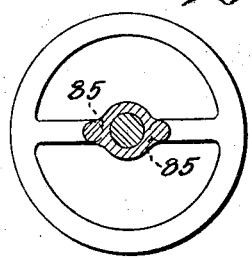
Inventor
AUGUST L. SEGLEHORST
AND
ERNIE L. LAUNDER
By
Attorney Feb. 7, 1933.   A. L. SEGELHORST ET AL   1,896,497
WELDING AND CUTTING APPARATUS
Filed Sept. 30, 1929    4 Sheets-Sheet 4
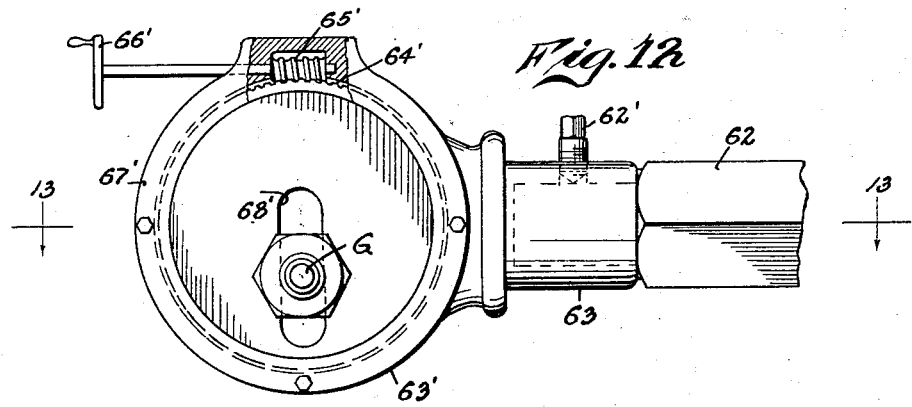
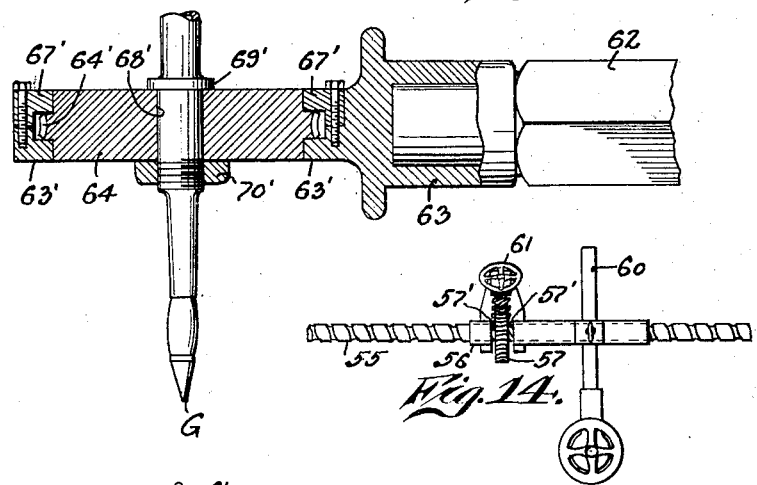
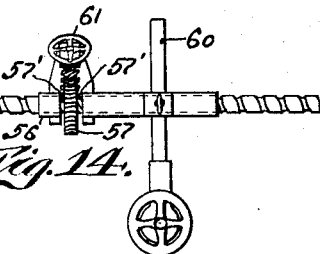
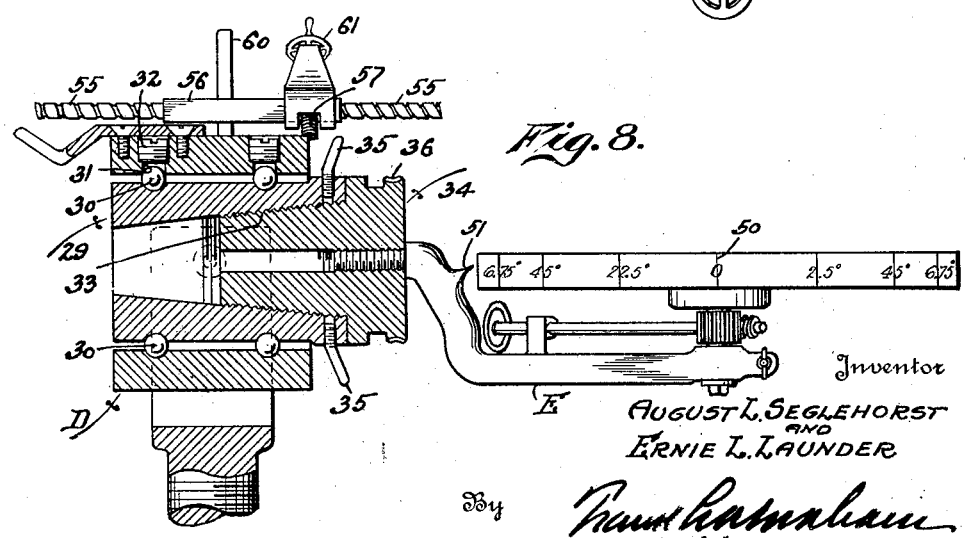
Inventor
AUGUST L. SEGLEHORST
AND
ERNIE L. LAUNDER
By  Frank Cranahan
Attorney Patented Feb. 7, 1933

1,896,497

UNITED STATES PATENT OFFICE

AUGUST L. SEGELHORST AND ERNIE L. LAUNDER, OF HUNTINGTON BEACH, CALIFORNIA

WELDING AND CUTTING APPARATUS

Application filed September 30, 1929. Serial No. 396,123.

The hereinafter described invention has to do with a welding and cutting apparatus, and deals particularly with an apparatus arranged and adapted to handle work requiring treatment from several different angles and in several different forms.

In operating with a welding or cutting apparatus, it is imperative that some efficient means of holding the work be devised. It is not sufficient that a simple supporting means be provided. The accuracy required in work of this type has risen to such a high point that a work-supporting table embodying means to permit movement in all directions or, in other words, universal movement has become a necessity. In respect to the work done by welding or cutting, it is common practice that a single piece of work may require a circular cut or weld, followed by a straight line cut or weld, and finished off with a beveled edge. It is, therefore, an object of this invention to provide an apparatus capable of performing such work.

Furthermore, it is an object of this invention to provide an apparatus of the character described wherein the work may be moved in conformance with any required plan of cutting or welding without resorting to extraneous means such as grappling hooks, chain blocks, protractors, etc.

In the apparatus contemplated by this invention, the aforesaid improvements are attained by incorporating in a single piece of apparatus a work-supporting table capable of rotating about a substantially vertical axis, the said vertical axis being mounted in a manner to rotate about an axis at right angles thereto together with a cutting and welding tool arranged on lead screws to be longitudinally and/or transversely advanced or retracted with respect to the work, said lead screws being also mounted to swing the cutting and welding tool into an out of the way position.

In the oil industry it has become a common practice to build up cutting bits by means of a welding tool. It, therefore, becomes another object of this invention to provide a supporting structure having means therein for mounting a drill bit in a manner to be rotated, with a welding tool arranged on a lead screw to be advanced or retracted substantially parallel to the drill and having a cross feed on said lead screw arranged to advance or retract the welding tool transversely with respect to the drill bit, together with a gage means mounted upon said supporting structure for determining when the bit has been built up to the required size.

It is to be understood that when used as an apparatus for treating drill bits, the supporting table is removed and the drill bit substituted therefor, and the same chuck member that supports the table is adapted to support the drill bit.

Another feature of this invention resides in the provision of means for raising and lowering the supporting structure and table to accommodate the work-supporting table to various sorts of work such as extra heavy pieces of work, and extra large pieces of work.

In turning out work requiring a high degree of accuracy, it is necessary to have a table capable of being moved with precision, both with respect to the work supporting table and the cutting and welding tool. Accordingly, it is a further object of this invention to provide an apparatus having these characteristics.

In mounting heavy work to be treated by a welding apparatus, it often becomes necessary to shift the center of gravity of said work to make it fall within the points of support of the welding apparatus. This invention contemplates the provision of means for spatially locating the center of gravity of the work within the points of support of said apparatus.

The foregoing objects and advantages, together with any subsequent features or novelties that may be developed in the description and claims, constitute my invention, a preferred form of which is shown by way of an example in the accompanying drawings in which Fig. 1 is a side elevation of my apparatus showing the revoluble work supporting table in place;

Fig. 3 is a front elevation of the same;

Fig. 4 is a fragmentary enlarged perspective view of the cross feed as applied to the cutting and welding tool;

Fig. 5 is a fragmentary view showing the means of raising and lowering the apparatus on its pedestal base, and may be considered as taken on the line 5—5 of Fig. 1;

Fig. 6 is another form which may be used in place of that form shown in Fig. 5;

Fig. 7 is a fragmentary view partly in section of the means whereby the pedestal supporting member is rotated through an arc;

Fig. 8 is a sectional view taken on the line 8—8 of Fig. 2;

Fig. 9 is a section taken on the same line of Fig. 2 but showing the drill bit in place of the arm which supports the work table;

Fig. 10 is a fragmentary enlarged plan view showing the method of using the gage in building up a drill bit;

Figure 1:
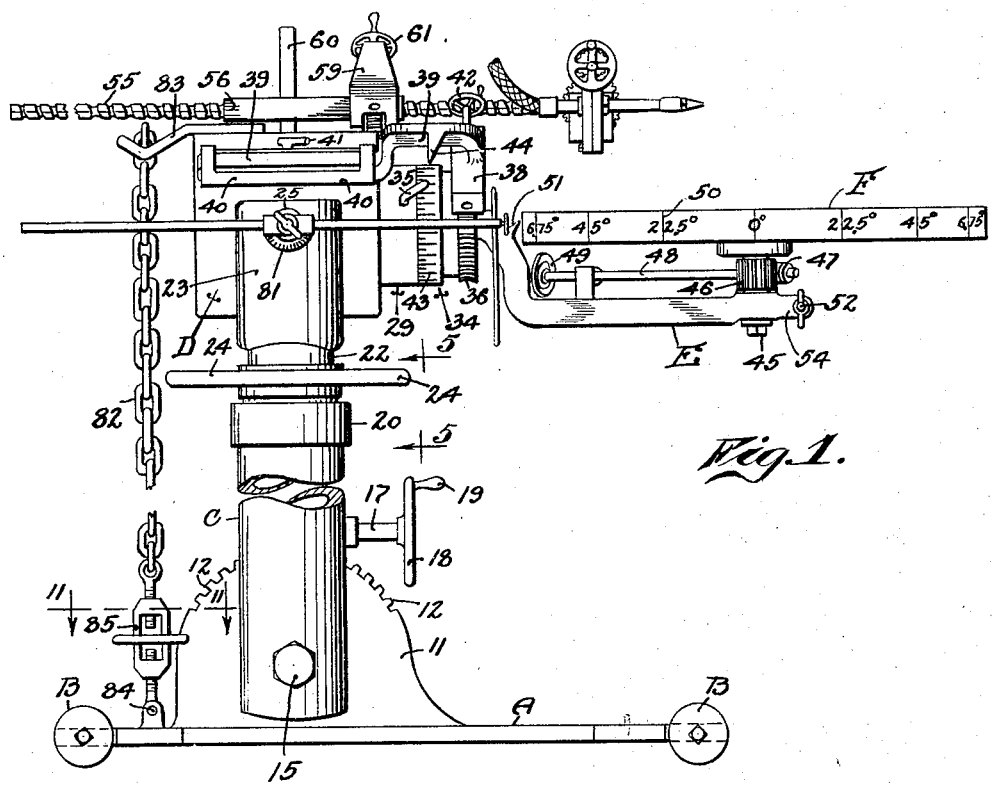
Figure 2:
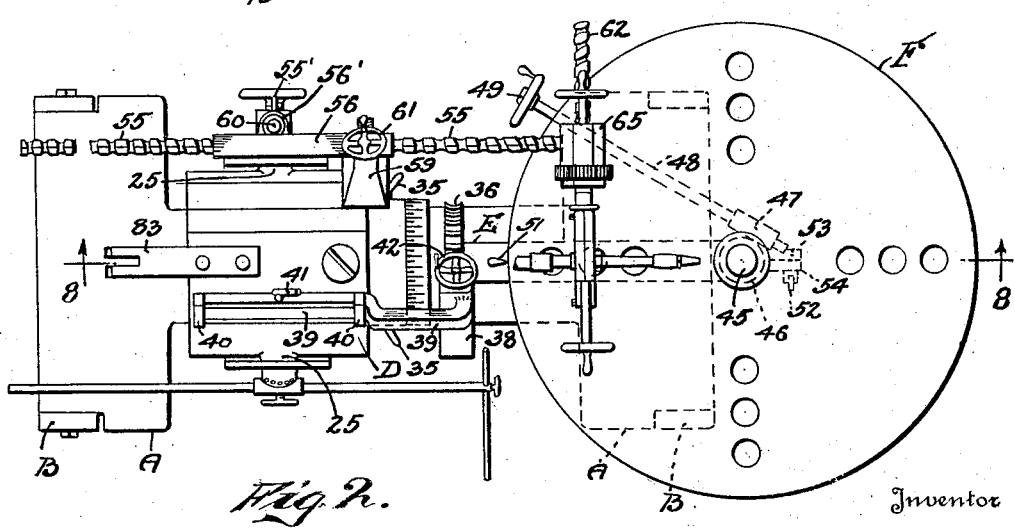
Fig. 2 is a plan view of the same.

Fig. 11 may be considered as a section on the line 11—11 of Fig. 1;

Fig. 12 is a fragmentary plan view showing the arrangement of mounting the cutting and welding tool;

Fig. 13 may be considered as a section on the line 13—13 of Fig. 12; and

Fig. 14 may be considered as a fragmentary view taken on the line 14—14 of Fig. 3.

In the preferred form of our invention, which we have chosen for purposes of illustration, we have shown the apparatus as comprising a platform A mounted upon wheels B, and carrying a pedestal supporting member C having pivotally mounted at its upper end a body member D which, in turn rotatably supports an extended arm E that has at its outer end a revoluble table F mounted thereon, together with a cutting or welding tool G controllably mounted upon the said body D. The foregoing parts will hereinafter be more fully described in the order named.

The platform A, which is mounted upon the wheels B, is provided with an upstanding arcuate member 11 which is equipped with worm gear teeth 12. As a means of mounting the pedestal C upon the arcuate member 11 we bifurcate the lower portion of the pedestal C and form the legs 13 and 14 which straddle the member 11. A bolt 15 pivots the legs 13 and 14 upon the member 11. The means for operating the pedestal C upon the pivot bolt 15 consists of a worm 16 arranged within the pedestal C and provided with a shaft 17 which, in turn, is rotated by a wheel 18 having a handle 19. With this arrangement, it is clear that the pedestal C may be angularly rotated with respect to the platform A, and by means of the worm and worm gear teeth 12 locked in any desired position of angularity.

Means for raising and lowering the body and work table of the apparatus consists of a collar 20 mounted upon the upper end of the pedestal C, and loosely holding an inner collar 21, which inner collar is internally screw threaded on a stem 22 having a yoke 23 at its upper end, said collar 21 being turnable by a hand wheel 24, which is attached thereto. This arrangement of parts provides a means of raising the stem 22 relative to the pedestal C, and since the stem 22 carries the yoke 23 which, in turn, carries the hubs 25, whereby the body D is pivotally supported, it becomes apparent that this means operates to raise or lower the work table relative to the platform A. In this respect, Fig. 6 shows another form which may be used for the same purpose and which consists of a stem 22' having openings 26 therein. The pedestal C in this form is provided with an opening 27 adapted to receive a pin 28, which pin is also adapted to pass through the openings 26. It is apparent that by removing the pin and raising or lowering the stem 22' until another opening 26 comes into registration with the opening 27, and again inserting the pin that the same results are obtainable.

The body member D, as before stated, is carried on the hubs 25 mounted in the yoke 23. The body member D is further provided with an inner rotatable member 29 which is mounted upon ball bearings 30. As a means of inserting the ball bearings between the rotatable member 29 and the body member D, we have provided openings 31 in the upper part of the member D adapted to permit dropping the ball into the ball races when the races are brought into registration. The openings 31 are then closed by a slotted screw threaded plug 32. The inner rotatable member 29 is provided with a tapered screw-threaded chuck opening 33 into which a chuck piece 34 is adapted to enter and be held against rotation by the lock member 35. The chuck piece 34 is equipped with a worm gear 36 adapted to be rotated by a worm 37 which, in turn, is held in a yoke 38, said yoke being supported on an arm 39, which arm, in turn, is supported in a bracket member 40 mounted on the body D. The bracket member 40 is provided with a set-screw member 41 arranged to hold the arm 39 securely in the bracket member 40. The worm 37 is provided with a manually operable wheel 42. The arm E is fixed within and supported by the chuck piece 34.

From the foregoing arrangement, it is clear that by operating the hand wheel 42 a rotation of the inner member 29 and the chuck piece 34 is set up which turns the arm E about a horizontal axis. We have also provided a means of denoting the degree of turning; which means consists of graduations 43 upon the member 34 and a finger 44 upon the arm 39. With this feature, we are able to rotate the table F any required or predetermined number of degrees about a horizontal axis.

The table F is revolubly supported upon the outer end of the arm E by means of a pivot 45. Means is provided for rotating the table F about said pivot 45 and preferably consists of a worm gear 46 driven by a worm 47 mounted upon the shaft 48 and operated through a hand wheel 49. In order to determine the exact number of degrees of rotation of the table F, we have provided on the periphery of said table a protractor arrangement as shown at 50 which, in conjunction with the finger 51 on the arm E, operates to denote the exact number of degrees of rotation. Auxiliary means for use when requiring a high degree of precision is also provided for locking said table at any desired point of rotation and consists of a clamping screw 52 which is arranged to clamp the bifurcated members 53 and 54 at the end of the arm E about the pivot point 45. The foregoing arrangement is seen to provide a rotation to the table about the pivot point 45 together with means for determining the exact amount of rotation and means for locking said table in the desired point of rotation.

Means is provided for mounting the cutting and welding tool in a manner to impart a longitudinal movement and a transverse movement together with a swinging movement thereto with respect to the apparatus, and preferaby consists of a lead screw bar 55, which is shown as being square in cross-section and mounted in a squared sleeve 56, said sleeve being provided with a collar 56' adapted to slidably fit over an upright post 60 which, in turn, is held in a socket 60', in this instance shown as a part of the body D. The collar 56' serves as a means of adjustably raising and lowering the welding and cutting organization with respect to the work, and for this purpose is provided with a set-screw 55'. The foregoing arrangement is also operable to swing the cutting and welding organization on the post 60 into an inoperative and out-of-the-way position. The sleeve 56 is transversely notched as at 57' to receive a worm gear 57, which is provided with internal screw threads and adapted to be mounted on the screw-threaded lead bar 55 and effect an advancement or retraction of said bar through the sleeve 56 upon the rotation of the worm gear. The means for rotating said worm gear consists of a worm 58 mounted in a bracket 59 which, in turn, is mounted upon the sleeve 56. A hand wheel 61 is arranged to rotate the worm 58.

It will be noted that the utilization of a screw-threaded square bar arranged to travel within a square sleeve, operates without any additional means such as splined keys, slots, or other expedients of like nature, to prevent rotation of said traveling bar.

Means for transmitting a transverse movement to the cutting and welding tool G are provided, and in the embodiment shown comprise a square screw-threaded shaft 62 which operates through a block 65 mounted on the end of the lead screw bar 55. As shown in Fig. 4, the block 65 is adapted to rotate upon the end of the lead screw bar 55, and is arranged to be held in predetermined fixed position by means of a set-screw 66. The block 65 is further provided with a squared opening 67 through which the shaft 62 extends and is also provided with a slotted opening 68 adapted to receive a gear 69 having internal screw threads arranged to engage the screw-threaded shaft 62. The means for driving said gear 69 comprises a companion gear 70 mounted upon a shaft 71 which is journaled in the block 65 and rotated by means of a wheel 72.

A hub 63 is mounted on the end of the shaft 62 and is held thereon by means of a set-screw 62'. The hub 63 has an extending ring 63' adapted to rotatably receive an inner concentric plate member 64. The inner plate member 64 is peripherally equipped with worm gear teeth 64' and is arranged to be driven by a worm 65' shown as manually operated by means of the hand wheel 66'. The plate 64 is suitably held on the ring 63' by means of a detachable ring 67'. In order to utilize the arrangement just described as a means of operating the cutting and welding tool in circles of varying diameters, the plate 64 is further equipped with an eccentric slot 68' through which the cutting and welding tool G may be inserted and held by any common expedient such as a flange 69' and a nut 70'.

The foregoing described means provides an arrangement whereby a transverse movement together with a circular movement may be imparted to the cutting and welding tool G, and also a vertical adjustment may be had on the cutting tool by means of rotating the block 65 on the bar 55. Another means of obtaining vertical adjustment has been previously described in relation to the post 60.

This invention also provides, in conjunction with the supporting structure and the arrangement of the cutting tool, a means for mounting a drill bit or any other work directly upon the supporting structure to take full advantage of the arrangement of the parts of the structure. For this purpose, the inner rotating member 29, which is arranged and adapted to rotate within the body D, is provided with the aforementioned screw-threaded tapered chuck; and in mounting a drill or any other class of work in said chuck, the chuck piece 34 with its attendant mechanism consisting of the worm wheel 36, the extending arm E, and the revoluble table F, together with the worm 37, and its supporting arm 39, are removed. The chuck piece 34, is then removed and a bushing 73 is inserted into the chuck opening 33, which is held against rotation therein by means of the lock member 35. The bushing 73 is further provided with internal screw threads 74 adapted to receive a pin member of a drill bit H. The drill bit H having been thus mounted, may be rotated to any desired position and locked in place by means of the screw-threaded pin 75 which passes through the hub 25 of the body member D, and engages the internal member 29, as best shown in Fig. 10. On the opposite side of the body D, from the pin 75, we have provided a sleeve 76 pivotally mounted on the hub 25, said sleeve being arranged to support a rod 77 having at its outer end an adjustable gage marker 78 held in place by a set-screw 79. The rod 77 is arranged to be longitudinally advanced or retracted with respect to the work, and means for doing this consists of the aforementioned sleeve 76 and a set-screw 80 operable to clamp the rod 77 within the sleeve. The gage marker 78 is seen to be provided with transverse movement, which, in combination with the longitudinal movement of the rod, provides a universal movement for said gage.

In connection with the set-screw 80 and the sleeve 76, a protractor arrangement 81 is provided for determining any vertical angular adjustment that may be required on said rod 77.

The arrangement just set forth is particularly adaptable for building and reforming worn drill bits. It is to be understood that the same combination of movement, both with regard to the supporting structure and the cutting and welding tool, remain as part of the combination when used in connection with a drill bit. It, therefore, becomes apparent that this invention combines an apparatus particularly useful to the oil industry, whereby worn drill bits may be rebuilt and brought to standard specification. In this respect, the gage 77 becomes particularly useful in that it operates to control the building of each side of the bit with precision. It is also obvious that in place of a drill bit any other piece of work could be mounted in the chuck and treated in any required manner.

Means is provided to operate in conjunction with the pivotal hubs 25 to hold the body member D in fixed horizontal positions. Such means is preferably shown as a chain 82, one end of which engages a pronged member 83 mounted on the rear portion of the body member D, and the opposite end of which is pivotally connected to the platform A, as shown at 84. The chain 82 is further provided with a turn buckle 85. With the arrangement as set forth, it is clear that an adjustment may be had relative to the length of the chain by means of the links in the chain and the slotted member 83, and that a micrometer adjustment for leveling the work may be effected through the turn buckle 85. It is apparent that this adjustable feature operates throughout all angles in which the pedestal C may be set on the pivot 15.

While we have shown a particular embodiment of our invention, we are aware that certain modifications in the structure may be resorted to and still remain within the scope of our disclosure. We, therefore, reserve the right to such modifications and alterations in the nature of refinements which do not depart from the scope of the disclosure nor the spirit of the claims.

We claim as our invention:

1. In a welding and cutting apparatus: a welding and cutting tool having means for longitudinal advancement and retraction with respect to the work; means for transverse advancement and restraction with respect to the work, said means for longitudinal advancement including a square screw-threaded traveling bar; a supporting member for said bar, said supporting member having a square opening adapted to receive said bar and prevent turning of the same and screw-threaded means for advancing and retracting said bar through said opening.

2. In a welding and cutting apparatus: a welding and cutting tool having means for longitudinal advancement and retraction with respect to the work; means for transverse advancement and retraction with respect to the work, said means for longitudinal advancement including a screw-threaded traveling bar having a substantially square cross-section; means for advancing and retracting said bar, said last mentioned means including a sleeve having a substantially square opening therethrough adapted to slidably receive said traveling bar, said sleeve also having a slot transversely arranged across the opening therethrough; a gear mounted within said slot and on said bar, said gear having internal screw threads adapted to operably engage the screw threads on said bar; and means for optionally rotating said gear to effect advancement and retraction of said bar.

3. In a welding and cutting apparatus of the character described: a supporting structure having horizontal pivots and a body pivotally mounted on said horizontal pivots, said body having an inner rotatable member provided wtih a chuck opening.

4. In a welding and cutting apparatus of the character described: a supporting structure; a body pivotally mounted on said supporting structure, said body having an inner rotatable member provided with a chuck opening; a work table supporting member detachably mounted in said chuck opening; and means for rotating said inner rotatable member detachably mounted upon said body.

5. In a welding and cutting apparatus of the character described having a welding and cutting tool provided with a longitudinal and a transverse movement; a body having an inner rotatable member adapted to receive a drill bit; and gauge means mounted upon said body and arranged to cooperate with a drill bit when mounted in said inner rotatable member.

6. An organization for welding and cutting, including: a platform; a pedestal pivotally mounted on said platform; a body member mounted on pivot points supported by said pedestal; a work table pivotally mounted on said body member; and means for rotating said pedestal on its pivotal mounting.

7. An organization for welding and cutting, including: a platform; a pedestal pivotally mounted on said platform; a body member mounted on pivot points supported by said pedestal; a work table pivotally mounted on said body member; and means for rotating said pedestal on its pivotal mounting, said means including a worm mounted on said pedestal and engaging a segment of a worm gear mounted upon said platform.

8. An organization for welding and cutting including: a platform; a pedestal mounted on said platform; a body member mounted on pivot points supported by said pedestal; a work table pivotally mounted on said body member; means for raising or lowering said body member relative to said pedestal; and means for rotating said pedestal on its pivotal mounting.

9. An organization for welding and cutting, including: a platform; a pedestal pivotally mounted on said platform; a body member mounted on pivot points supported by said pedestal; means for holding said body member in a fixed position on said pivot points; a work table pivotally mounted on said body member; and means for rotating said pedestal on its pivotal mounting.

10. An organization for welding and cutting, including: a platform; a pedestal pivotally mounted on said platform; a body member mounted on pivot points supported by said pedestal; means for holding said body member in various fixed positions on said pivot points, said means including a chain having a turn buckle therein; a work table pivotally mounted on said body member; and means for rotating said pedestal on its pivotal mounting.

11. An organization for welding and cutting, including: a platform; a pedestal mounted on said platform; a body member mounted on pivot points supported by said pedestal; means for adjustably holding said body member in fixed positions on said pivot points; a work table pivotally mounted on said body member; and means for rotating said pedestal on its pivotal mounting.

12. In a welding and cutting apparatus of the character described, having a welding and cutting tool provided with a longitudinal and a transverse movement: a body having an inner rotatable member; and means for removably mounting a drill bit in said rotatable member.

13. In an organization of the character described: means for supporting a drill bit by its pin end; means for rotating said drill bit on its longitudinal axis; and means for advancing and retracting a cutting and welding tool longitudinally of said bit.

14. In an organization of the character described: means for supporting a drill bit by its pin end; means for rotating said drill bit on its longitudinal axis; means for advancing and retracting a cutting and welding tool longitudinally of said bit; and gage means arranged to extend longitudinally of said bit.

15. In a welding and cutting apparatus of the character described: a supporting structure and a body pivotally mounted on said supporting structure, said body having an inner rotatable member; means for mounting a drill bit in said rotatable member; and gage means mounted on said body and extending substantially parallel with the axis of said drill bit.

16. An apparatus of the character described comprising a supporting structure, a body rotatable upon said supporting structure about a transverse horizontal axis to provide for adjustment, means for holding said body in adjusted position with respect to the supporting structure, means for mounting a drill bit or the like upon said body for rotation about the longitudinal axis of the bit, and gauge means mounted upon said body adjustable in longitudinal and transverse directions.

In testimony whereof, we have hereunto set our hands at Los Angeles, California, this 20th day of September, 1929.

AUGUST L. SEGELHORST.
ERNIE L. LAUNDER.